United States Patent
Lane et al.

(10) Patent No.: US 9,814,213 B1
(45) Date of Patent: Nov. 14, 2017

(54) ANIMAL WATERING VALVE

(71) Applicants: Timothy E. Lane, Cudahy, WI (US);
James Buchanan, Belvidere, IL (US)

(72) Inventors: Timothy E. Lane, Cudahy, WI (US);
James Buchanan, Belvidere, IL (US)

(73) Assignee: LANE INDUSTRIES COMPANY, Cudahy, WI (US)

( * ) Notice: Subject to any disclaimer, the term of this patent is extended or adjusted under 35 U.S.C. 154(b) by 91 days.

(21) Appl. No.: 14/666,677

(22) Filed: Mar. 24, 2015

(51) Int. Cl.
*A01K 7/00* (2006.01)
*A01K 7/06* (2006.01)

(52) U.S. Cl.
CPC ..................................... *A01K 7/06* (2013.01)

(58) Field of Classification Search
CPC . A01K 7/00; A01K 7/022; A01K 7/06; A01K 39/02; A01K 39/0213
USPC ....... 119/72, 72.5, 454, 456, 515, 521, 51.5, 119/75
See application file for complete search history.

(56) References Cited

U.S. PATENT DOCUMENTS

| 3,800,825 | A | * | 4/1974 | Zoll | A01K 7/06 |
| | | | | | 119/72.5 |
| 4,402,343 | A | * | 9/1983 | Thompson | A01K 7/06 |
| | | | | | 119/72.5 |
| 4,896,629 | A | * | 1/1990 | Johnson | A01K 7/06 |
| | | | | | 119/72.5 |
| 5,065,700 | A | | 11/1991 | Cross | |
| 5,373,811 | A | * | 12/1994 | Wastell | A01K 7/06 |
| | | | | | 119/72.5 |
| 6,003,468 | A | | 12/1999 | Edstrom, Sr. et al. | |
| 8,844,467 | B1 | * | 9/2014 | Folkerts, Jr. | A01K 7/06 |
| | | | | | 119/72.5 |
| 2008/0196670 | A1 | * | 8/2008 | Clark | A01K 39/0213 |
| | | | | | 119/73 |
| 2014/0261205 | A1 | * | 9/2014 | Herring, II | A01K 7/06 |
| | | | | | 119/72 |
| 2015/0083049 | A1 | * | 3/2015 | Vignes | A01K 39/0213 |
| | | | | | 119/72 |

FOREIGN PATENT DOCUMENTS

| DE | 3422722 | * | 12/1984 |
| JP | 08228626 A | * | 9/1996 |

OTHER PUBLICATIONS

JP 08228626 A (computer translation).*
DE 3422722 (computer translation).*

* cited by examiner

*Primary Examiner* — Trinh Nguyen
(74) *Attorney, Agent, or Firm* — Donald J. Ersler

(57) ABSTRACT

An animal watering valve preferably includes a valve body, a valve stem, a retention plug, a stem o-ring and a compression spring. A valve bore is formed in the one end of the valve body to receive the valve stem. A plug bore is formed in the opposing end of the valve body. The valve stem preferably includes a sealing base, an actuation end, a plug end and a spring flange. An o-ring groove is formed in the sealing base to receive the stem o-ring. The retention plug preferably includes a threaded portion, a rotation flange and a stem portion. A stem bore is formed through the retention plug. The stem bore is sized to loosely receive the plug end of the valve stem. The plug end is inserted into the compression spring. The retention plug is threaded into the plug bore to retain the valve stem.

20 Claims, 3 Drawing Sheets

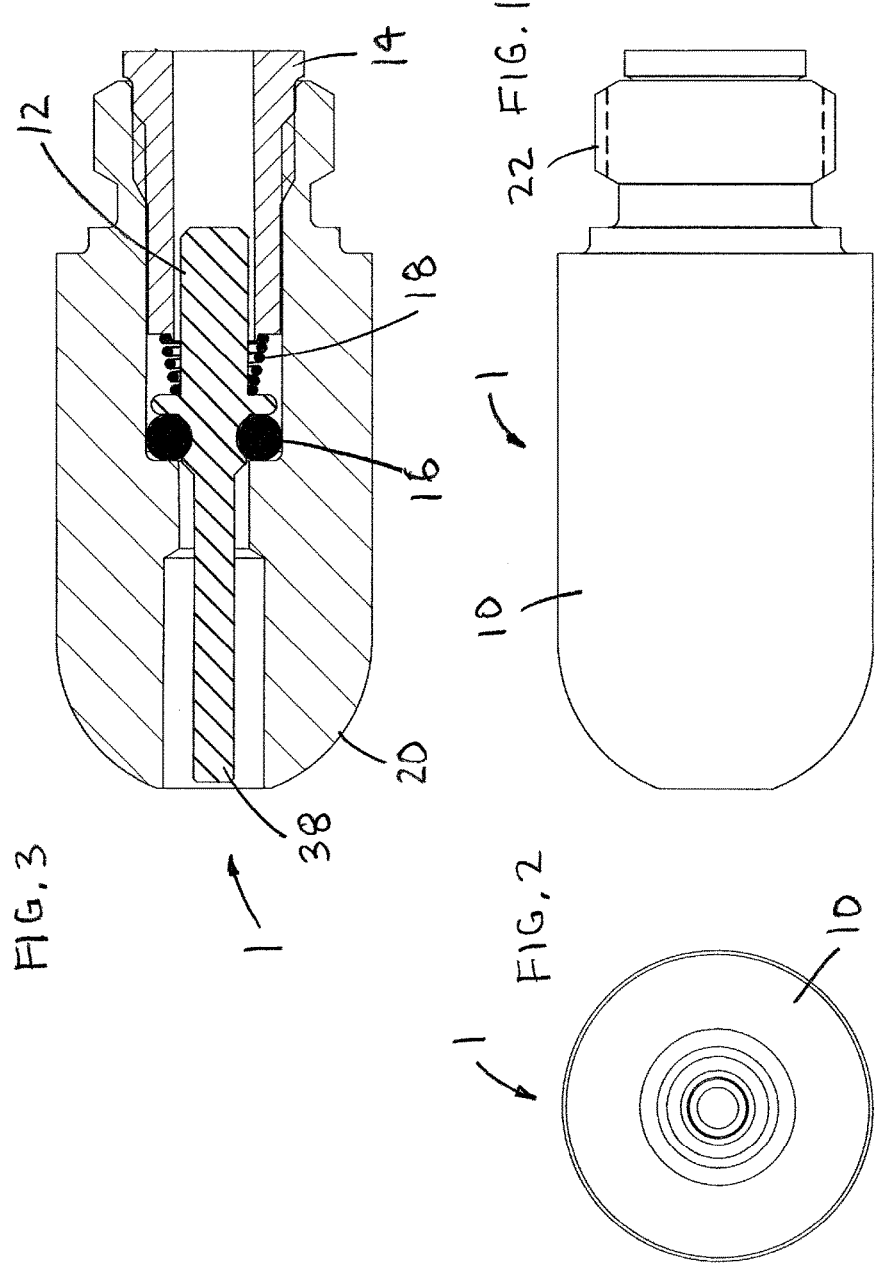

ANIMAL WATERING VALVE

BACKGROUND OF THE INVENTION

1. Field of the Invention

The present invention relates generally to feeding animals and more specifically to an animal watering valve, which functions better than that of the prior art for smaller animals.

2. Discussion of the Prior Art

U.S. Pat. No. 5,065,700 to Cross discloses a shutter for animal-watering valve. U.S. Pat. No. 6,003,468 to Edstrom, Sr. et al. discloses an animal watering valve with deflectable elastomeric boot.

Accordingly, there is a clearly felt need in the art for an animal watering valve, which functions better than that of the prior art for smaller animals.

SUMMARY OF THE INVENTION

The present invention provides an animal watering valve, which functions better than that of the prior art for smaller animals. The animal watering valve preferably includes a valve body, a valve stem, a retention plug, a stem o-ring and a compression spring. The valve body preferably includes a bullet nose formed on one end and a threaded shank formed on an opposing end thereof. The threaded shank preferably has a diameter that is less than that of the valve body. An o-ring groove is formed between an end of the valve body and an end of the threaded shank to receive a body o-ring. A valve bore is formed in the one end of the valve body to receive the valve stem. A through hole is formed through a length of the valve body. A plug bore is formed in the opposing end of the valve body to substantially a middle of a length thereof. A portion of an entrance of the plug bore is threaded to form a plug thread. The valve stem preferably includes a sealing base, an actuation end, a plug end and a spring flange. The actuation end extends from one end of the sealing base and the spring flange extends from an opposing end of the sealing base. The plug end extends from the spring flange. An o-ring groove is formed in the sealing base to receive the stem o-ring. The retention plug preferably includes a threaded portion, a rotation flange and a stem portion. The stem portion extends from one end of the threaded portion and the rotation flange is formed on an opposing end of the threaded portion. A pair opposing flats are preferably formed on an outer perimeter of the rotation flange. The plug thread of the valve body is sized to threadably receive the threaded portion of the retention plug. A stem bore is formed through the retention plug. The stem bore is sized to loosely receive the plug end of the valve stem. The compression spring is preferably conical shaped. However, a cylindrically shaped compression spring may also be used.

The animal watering valve is preferably assembled in the following manner. The stem o-ring is inserted into the o-ring groove in the sealing base. The plug end of the valve stem is inserted into the compression spring, such that a smaller diameter of the conical spring is in contact with the spring flange. The actuation end of the valve stem is inserted into plug bore, until the stem o-ring contacts a bottom of the plug bore. The retention plug is threaded into the valve body and tightened with the pair of opposing flats.

Accordingly, it is an object of the present invention to provide an animal watering valve, which functions better than that of the prior art for smaller animals.

BRIEF DESCRIPTION OF THE DRAWINGS

FIG. 1 is a side view of an animal watering valve in accordance with the present invention.

FIG. 2 is an end view of an animal watering valve in accordance with the present invention.

FIG. 3 is a cross sectional view of an animal watering valve in accordance with the present invention.

DETAILED DESCRIPTION OF THE PREFERRED EMBODIMENTS

Figure 4:
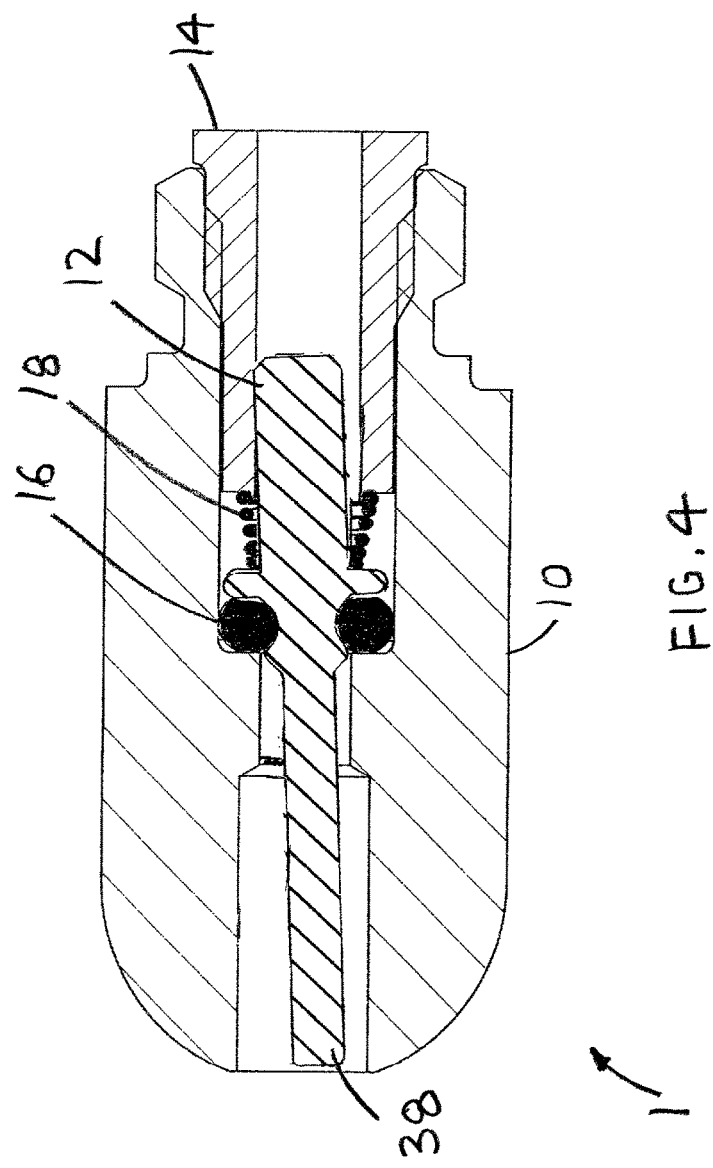
FIG. 4 is a cross sectional view of an actuation end of a valve stem in an actuation position to allow an animal to be watered of an animal watering valve in accordance with the present invention.
Figure 5:
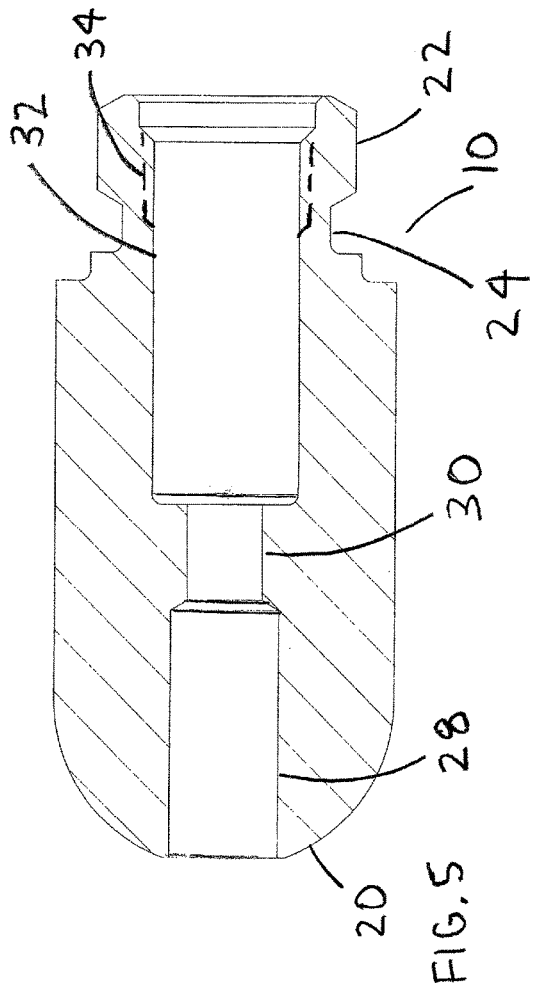
FIG. 5 is a cross sectional side view of a valve body of an animal watering valve in accordance with the present invention.
Figure 7:
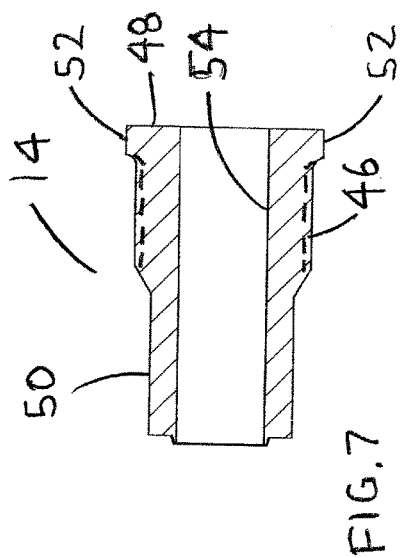
FIG. 7 is a cross sectional view of a retention plug of an animal watering valve in accordance with the present invention.
Figure 6:
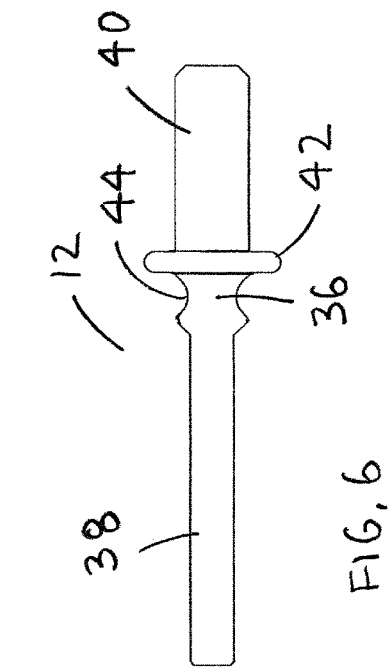
FIG. 6 is a side view of a valve stem of an animal watering valve in accordance with the present invention.

With reference now to the drawings, and particularly to FIG. 4, there is shown a cross sectional view of an animal watering valve 1. With reference to FIGS. 1-3 and 5-7, the animal watering valve 1 preferably includes a valve body 10, a valve stem 12, a retention plug 14, a stem o-ring 16 and a compression spring 18. The valve body 10 preferably includes a bullet nose 20 formed on one end and a threaded shank 22 formed on an opposing end thereof. The threaded shank 22 preferably has a diameter, which is less than that of the valve body 10. An o-ring groove 24 is formed between an end of the valve body 20 and an end of the threaded shank 22 to receive a body o-ring. A valve bore 28 is formed in the one end of the valve body 10 to receive the valve stem 12. A through hole 30 is formed through a length of the valve body 10. A plug bore 32 is formed in the opposing end of the valve body to substantially a middle of a length thereof. A portion of an entrance of the plug bore 32 is threaded to form a plug thread 34. The valve stem 12 preferably includes a sealing base 36, an actuation end 38, a plug end 40 and a spring flange 42. The actuation end 38 extends from one end of the sealing base 36 and the spring flange 42 extends from an opposing end of the sealing base 36. With reference to FIG. 3, the actuation end 38 includes an outer perimeter and an end wall. The valve body 10 completely covers the outer perimeter of the actuation end 38, the end wall of the actuation end 38 is not covered by the valve body 10. The plug end 40 extends from the spring flange 42. An o-ring groove 44 is formed in the sealing base 36 to receive the stem o-ring 16. The retention plug 14 preferably includes a threaded portion 46, a rotation flange 48 and a stem portion 50. The stem portion 50 extends from one end of the threaded portion 46 and the rotation flange 48 is formed on an opposing end of the threaded portion 46. A pair opposing flats 52 are preferably formed on an outer perimeter of the rotation flange 48. The plug thread 34 of the valve body 10 is sized to threadably receive the threaded portion 46 of the retention plug 14. A stem bore 54 is formed through the retention plug 14. The stem bore 54 is sized to loosely receive the plug end 40 of the valve stem 12. The compression spring 18 preferably has a conical shape. However, a cylindrical shaped compression spring may also be used.

The animal watering valve 1 is preferably assembled in the following manner. The stem o-ring 16 is inserted into the o-ring groove 44 in the sealing base 36. The plug end 40 of the valve stem 12 is inserted into the compression spring 18, such that a smaller diameter of the conical spring 18 is in contact with the spring flange 42. The actuation end 38 of the valve stem 12 is inserted into plug bore 32, until the stem o-ring 18 contacts a bottom of the plug bore 32. The retention plug 14 is threaded into the plug thread 34 and tightened with a wrench (not shown) applied to the pair of opposing flats 52. With reference to FIG. 4, water is released through a portion of the stem o-ring 18, when the actuation end 38 is pivoted by a tongue of an animal. The valve body 10 is threaded into an animal drinking system (not shown).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An animal watering valve for use in an animal water system, comprising:
    a valve body includes a valve bore formed in one end, a plug bore is formed in an opposing end of said valve body;
    a valve stem includes a sealing base and an actuation end, said actuation end extends from one end of said sealing base, a stem o-ring groove is formed in a perimeter of said sealing base, said actuation end is retained in valve bore;
    a stem o-ring is located in said o-ring groove;
    a compression spring includes an inner perimeter sized to receive said plug end;
    a retention plug is threaded into said plug bore.

2. The animal watering valve for use in an animal water system of claim 1 wherein:
    said compression spring is a conical compression spring.

3. The animal watering valve for use in an animal water system of claim 1 wherein:
    a through hole is formed through said valve body.

4. The animal watering valve for use in an animal water system of claim 1 wherein:
    a rotation flange is formed on an end of said retention plug.

5. The animal watering valve for use in an animal water system of claim 4 wherein:
    a pair of opposing flats are formed on an outer perimeter of said rotation flange.

6. The animal watering valve for use in an animal water system of claim 1 wherein:
    said valve body includes a bullet nose formed on said one end, a threaded shank is formed on said opposing end of said valve body.

7. The animal watering valve for use in an animal water system of claim 1 wherein:
    a diameter of said threaded shank is less than a diameter of said valve body.

8. An animal watering valve for use in an animal water system, comprising:
    a valve body includes a valve bore formed in one end, a plug bore is formed in an opposing end of said valve body;
    a valve stem includes a sealing base, an actuation end and a plug end, said actuation end extends from one end of said sealing base, said plug end extends from an opposing end of said sealing base, a stem o-ring groove is formed in a perimeter of said sealing base, said actuation end is located in said valve bore;
    a stem o-ring is retained in said o-ring groove;
    a compression spring includes an inner perimeter sized to receive said plug end;
    a retention plug includes a plug hole, said plug hole is sized to receive said plug end, wherein said retention plug is threaded into said plug bore.

9. The animal watering valve for use in an animal water system of claim 8 wherein:
    said compression spring is a conical compression spring.

10. The animal watering valve for use in an animal water system of claim 8 wherein:
    a through hole is formed through said valve body.

11. The animal watering valve for use in an animal water system of claim 8 wherein:
    a rotation flange is formed on an end of said retention plug.

12. The animal watering valve for use in an animal water system of claim 11 wherein:
    a pair of opposing flats are formed on an outer perimeter of said rotation flange.

13. The animal watering valve for use in an animal water system of claim 8 wherein:
    said valve body includes a bullet nose formed on said one end, a threaded shank is formed on said opposing end of said valve body.

14. The animal watering valve for use in an animal water system of claim 8 wherein:
    a diameter of said threaded shank is less than a diameter of said valve body.

15. An animal watering valve for use in an animal water system, comprising:
    a valve body includes a valve bore formed in one end, a plug bore is formed in an opposing end of said valve body;
    a valve stem includes a sealing base, an actuation end, a plug end and a spring flange, said actuation end extends from one end of said sealing base, said spring flange extends from an opposing end of said sealing base, said plug end extends from said spring flange, a stem o-ring groove is formed in a perimeter of said sealing base, said actuation end is located in said valve bore;
    a stem o-ring is retained in said o-ring groove;
    a compression spring includes an inner perimeter sized to receive said plug end;
    a retention plug includes a plug hole, said plug hole is sized to receive said plug end, wherein said retention plug is threaded into said plug bore.

16. The animal watering valve for use in an animal water system of claim 15 wherein:
    said compression spring is a conical compression spring.

17. The animal watering valve for use in an animal water system of claim 15 wherein:
    a through hole is formed through said valve body.

18. The animal watering valve for use in an animal water system of claim 15 wherein:
    a rotation flange is formed on an end of said retention plug.

19. The animal watering valve for use in an animal water system of claim 15 wherein:
    a pair of opposing flats are formed on an outer perimeter of said rotation flange.

20. The animal watering valve for use in an animal water system of claim 15 wherein:
    said valve body includes a bullet nose formed on said one end, a threaded shank is formed on said opposing end of said valve body.

* * * * *